United States Patent [19]
Mayer

[11] Patent Number: 5,537,727
[45] Date of Patent: Jul. 23, 1996

[54] RELEASE TOOL FOR QUICK CONNECTOR WITH INTEGRAL RELEASE MEMBER

[75] Inventor: Michael J. Mayer, Goodrich, Mich.

[73] Assignee: ITT Corporation, New York, N.Y.

[21] Appl. No.: 314,356

[22] Filed: Sep. 28, 1994

[51] Int. Cl.[6] .................................................. F16L 35/00
[52] U.S. Cl. ............................ 29/237; 29/268; 81/424.5
[58] Field of Search ........................... 29/237, 268, 239; 81/423, 341, 487, 418, 419, 424.5

[56] References Cited

U.S. PATENT DOCUMENTS

| | | | |
|---|---|---|---|
| 442,426 | 12/1890 | Donnelly | 81/423 |
| 1,531,377 | 3/1925 | Clarke | 269/279 |
| 2,796,787 | 6/1957 | Aske | 269/279 |
| 3,176,551 | 4/1965 | Hansen | 81/341 |
| 3,571,894 | 3/1971 | Bilka | 29/268 |
| 3,845,538 | 11/1974 | Demler, Sr. . | |
| 4,467,512 | 8/1984 | Modes | 29/237 |
| 4,483,056 | 11/1984 | Schwalm et al. | 29/237 |
| 4,571,808 | 2/1986 | King | 29/268 |
| 4,757,588 | 7/1988 | Churchich | 29/268 |
| 4,793,637 | 12/1988 | Laipply et al. . | |
| 5,056,756 | 10/1991 | Norkey et al. . | |
| 5,084,954 | 2/1992 | Klinger . | |
| 5,161,834 | 11/1992 | Norkey . | |
| 5,187,851 | 2/1993 | Klinger . | |
| 5,213,376 | 5/1993 | Szabo . | |
| 5,226,230 | 7/1993 | Klinger . | |
| 5,228,728 | 7/1993 | McNaughton et al. . | |
| 5,277,089 | 1/1994 | McGushion | 29/268 |

FOREIGN PATENT DOCUMENTS

| | | |
|---|---|---|
| A515205 | 3/1921 | France . |
| 3322202 | 1/1984 | Germany . |
| 9100265 | 10/1991 | Germany . |
| 9307957 | 7/1993 | Germany . |
| 8204763 | 7/1984 | Netherlands . |
| 305859 | 2/1929 | United Kingdom . |

*Primary Examiner*—Robert C. Watson
*Attorney, Agent, or Firm*—Robert P. Seitter; J. Gordon Lewis

[57] ABSTRACT

A tool for releasing a connector from a fitting coupled together by a retainer element through movement of an integral release member mounted in the connector. The tool includes a pair of pivotally connected jaw levers, each with a bifurcated jaw end. The bifurcated jaws engage the connector and simultaneously slidably urge the release member into the connector to disengage the retainer element from the fitting to enable the decoupling and separation of the fitting and the connector. The jaws are of thin planer construction for insertion between the outer end of the release member and surrounding structure where access space is limited.

19 Claims, 2 Drawing Sheets

RELEASE TOOL FOR QUICK CONNECTOR WITH INTEGRAL RELEASE MEMBER

BACKGROUND OF THE INVENTION

1. Field of the Invention

The present invention relates, in general, to snap-fit connectors and, specifically, to quick connectors employed in fluid conduit systems to facilitate assembly and disassembly of fluid components, and, more specifically, to hand tools employed to decouple conduit fittings from mating connectors.

2. Background Description

Quick connectors have long been used to facilitate the assembly and disassembly of mechanical devices. This is particularly true in complex automotive systems wherein numerous fluid conduit interconnections are required.

In such connectors, a retainer is typically mounted within a female connector part or fitting in a relatively inaccessible position to lock a male member or conduit inserted into the female connector part. In order to separate the male conduit from the female connector, it is necessary to expand the deflectable legs on the retainer in a radially outward direction to enable an enlarged, annular abutment surface typically formed on the male conduit to pass by the ends of the legs and be removed from the female connector. Tools are frequently employed to effect the release of quick connect fittings by deflecting the retainer legs as shown in U.S. Pat. Nos. 5,084,954, 5,187,851 and 5,226,230.

Certain quick connector designs have a release member slidably mounted on the female fitting component as shown in U.S. Pat. Nos. 4,793,637, 5,056,756, 5,161,834 and 5,228,728. Such release members are slidable into the female connector part to engage and radially expand the deflectable legs of the retainer member to enable the enlarged annular abutment surface on the conduit to be easily removed from the female connector.

However, in certain applications, the quick connector is located in a relatively inaccessible position and is closely surrounded by other components which make the use of a separate tool to separate the male conduit from the female connector component relatively difficult if not impossible due to limited available space. Such limited space factors also make the quick connectors employing an integral release member on one of the components difficult to disassemble.

In one exemplary application, a fuel filter used in a motor vehicle has generally a cylindrical shape with opposed end walls. Short conduits extend axially outward from each end wall of the filter. Quick connectors carrying a fuel conduit at one end are releasably attachable to each filter conduit on the filter to connect the filter in the fuel delivery system of the vehicle. In this mounting position, the quick connectors are positioned such that the integral release member is located in close proximity to an end wall of the filter. This limited space between the end of the quick connector body and the end wall of the filter is insufficient for the insertion of the above-described release tools about the conduit into engagement with the integral release member to effect de-coupling of the connector from the short conduit on the filter.

The previously devised release tools for quick connectors, while generally effective for their intended purpose, have an axial length, when in a use position for internal engagement with the retainer element or to actuate the integral release member, which prohibits use of such release tools in connector applications where accessible space is limited. Such axial length of the release tools prohibits the mounting of the tools about the fitting between the end of the connector or the integral release member mounted in the connector and surrounding structure, barriers or components.

Thus, it would be desirable to provide a release tool for use with quick connectors used in fluid conduit systems which is usable to effect de-coupling of a connector from a fitting or conduit despite limited space between the end of the connector and surrounding components or barriers. It would also be desirable to provide a release tool for quick connectors which is usable with different sized connectors and fluid fittings or conduits. It would also be desirable to provide a release tool for quick connectors which is operable by a single hand. Finally, it would be desirable to provide a release tool for quick connectors which is capable of generating the necessary de-coupling force to separate the connector from a fitting or conduit.

SUMMARY OF THE INVENTION

The present invention is a release tool for releasing a quick connector from a conduit or fitting, coupled together by a retaining element mounted in the connector through movement of a release member integrally mounted in the connector.

The release tool includes first and second pivotally connected jaw levers, each having a bifurcated jaw end respectively engageable with a connector and with the integral release member mounted in the connector such that pivotal movement of the jaw ends in a direction causing relative closing movement of the jaw ends toward each other simultaneously engages the connector and axially urges the release member into engagement with the retainer member in the connector to de-couple the retainer member from the fitting to enable separation of the fitting and connector.

In a preferred embodiment, the first and second jaw levers are formed of elongated members pivotally connected at an intermediate portion between opposed handle and jaw ends. Each bifurcated jaw is integrally formed at the jaw end of each lever or provided in the form of a separate member fixedly or releasably attached to each jaw end. Preferably, each bifurcated jaw is in the form of a thin, planar fork having an open-ended aperture or slot extending from an outer end. The width of the aperture in each fork is sized to releasably engage either the fitting or a portion of the outer diameter of the connector. With the apertures respectively engaged about the fitting and the connector the surrounding portion of each fork engages the outer end of the integral release member extending outward from one end of the connector and an annular external shoulder formed on the connector to simultaneously engage the connector body and slidably and axially urge the integral release member into the connector to disengage the retainer element from the fitting to enable disengagement of the fitting and connector.

The apertures in each fork may be provided in different widths due to the different conventional diameters of fluid conduits and associated quick connectors.

In one embodiment, the forks are releasably attached to the jaw end of each jaw lever. This embodiment enables interchangeable forks to be employed with a single pair of jaw levers for use with different sized fittings and connectors. In an alternate embodiment, each fork may be provided in the form of a thin, generally planar disk having a plurality of circumferentially spaced fork portions, each with an opened ended aperture or slot formed therein, disposed about the disk. The disk can be rotated to bring a particular fork portion into a use position, thereby enabling the release tool to be used with most conventional sized fittings and quick connectors.

Means are also provided for axially adjusting the space between the jaw ends of the jaw levers. This is preferably provided by means of a slot formed in one of the jaw levers intermediate the opposed ends thereof, with the pivot pin adjustably positionable along the length of the slot to set the desired space in between the jaw ends.

The release tool of the present invention is advantageously employed in applications having limited axial access space between the end of a quick connector and surrounding structure or components. The release tool of the present invention is operable single handedly to simplify its use in limited access space applications. The release tool is also capable of providing the necessary force to de-couple the fitting from the connector. Finally, the release tool of the present invention is of simple construction for a low manufacturing cost.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figures 1, 5:
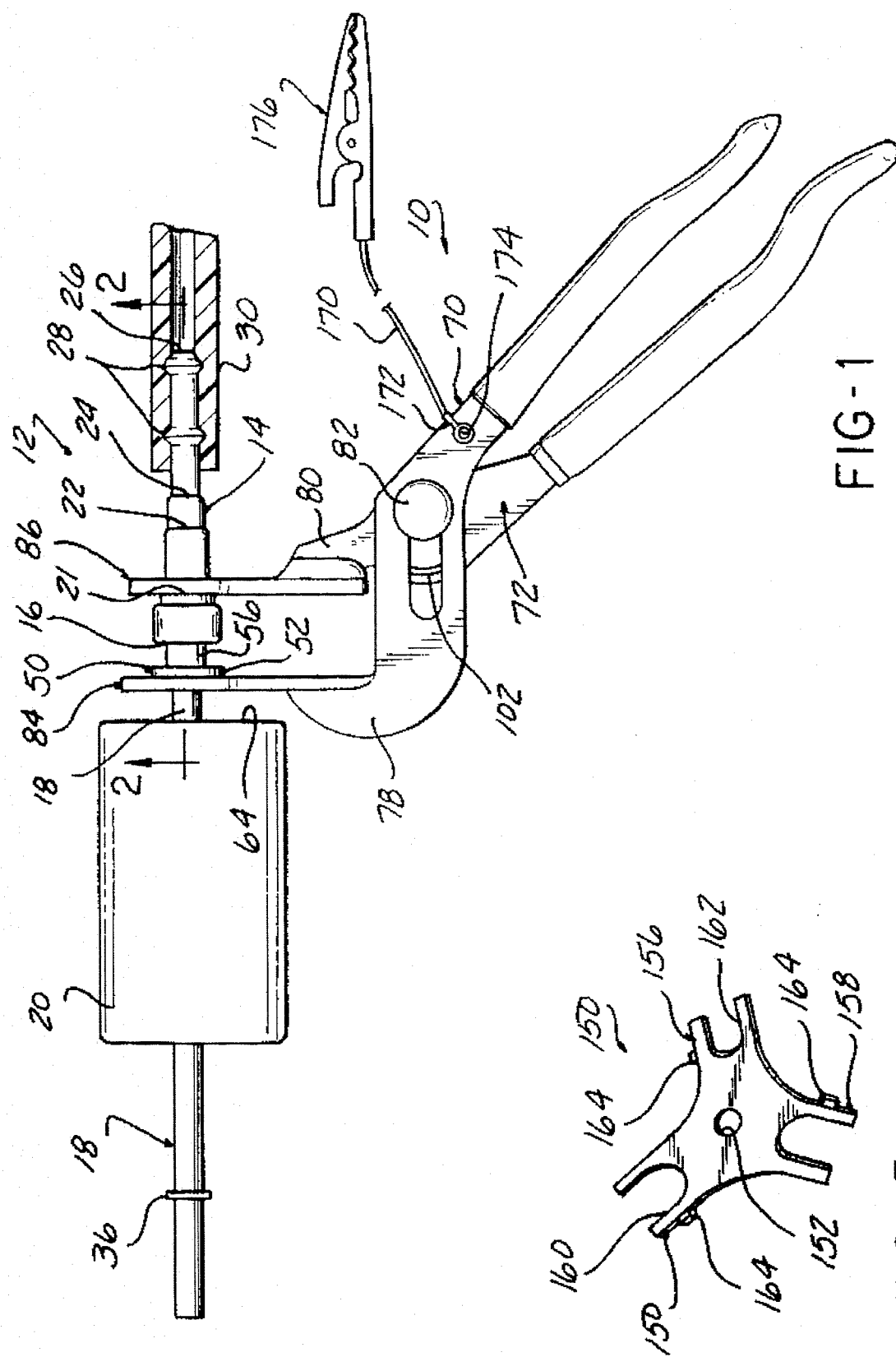
FIG. 1 is a side elevational view showing the release tool of the present invention in an operable position for disengaging a quick connector from a fitting or conduit mounted on a fuel filter.
FIG. 5 is a perspective view of a modification to the embodiment of the release tool of the present invention shown in FIG. 4.
Figure 3:
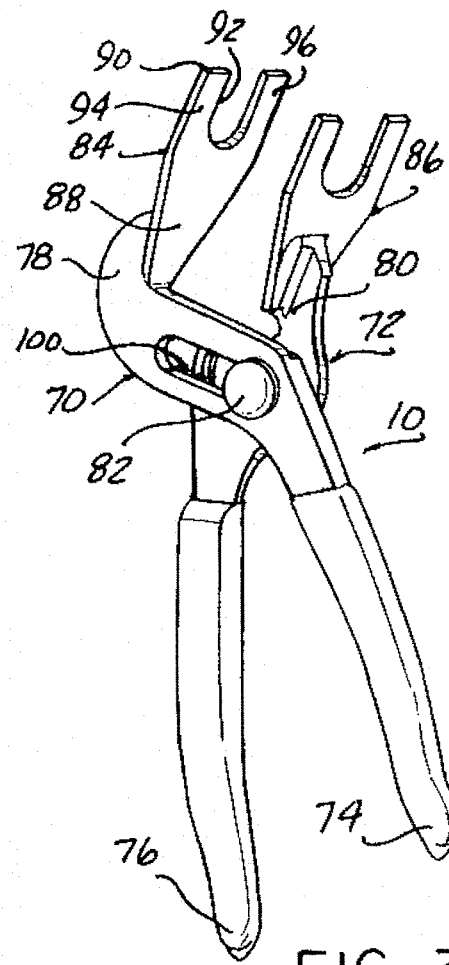
FIG. 3 is a perspective view of a first embodiment of the release tool of the present invention.

Referring now to the drawing, and to FIGS. 1, 3 and 3 in particular, there is depicted a release tool 10 for use with a quick connector 12 of the type used in fluid conduit systems to connect a fluid conduit to a fitting in a releasable connection.

Figure 2:
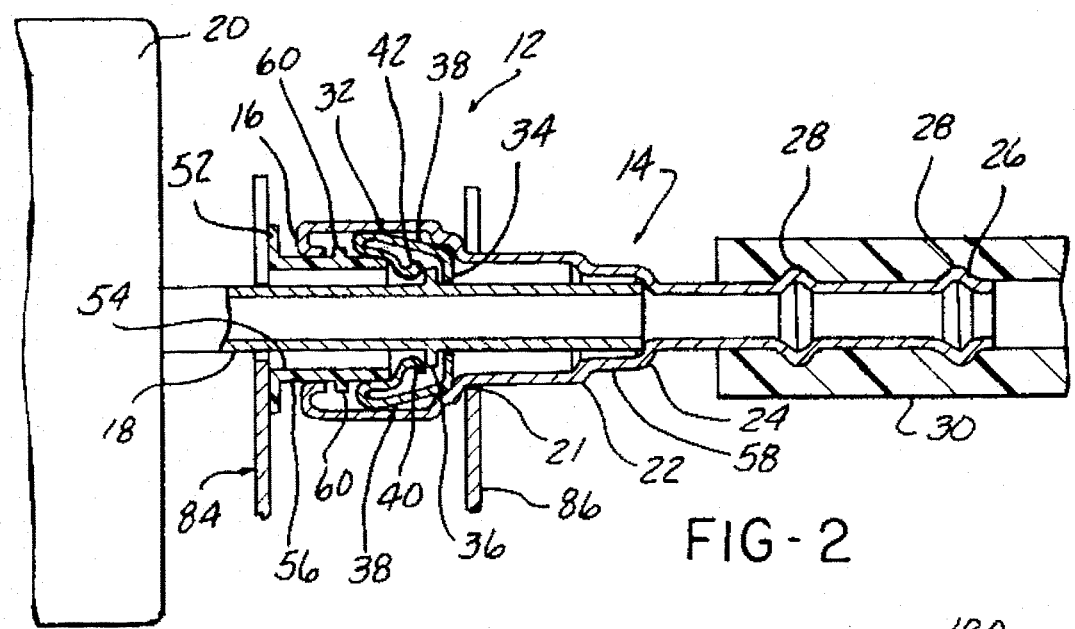
FIG. 2 is a longitudinal, cross-sectional view generally taken along line 2—2 in FIG. 1.

As shown in FIGS. 1 and 2, a conventional quick connector 12 has a female-type, hollow body 14 with a rolled in flange 16 formed at one end. The inner diameter between the opposed edges of the flange 16 is sized to releasably receive a fitting, such as a male fitting or conduit 18 mounted in and extending outward from a suitable component, such as a fuel filter 20, shown in FIGS. 1 and 2 by way of example only.

The connector body 14 may be provided in different sizes so as to receive standard conduits which typically outer diameters of ¼, ⁵⁄₁₆ and ⅜ inches.

The connector body 14 is typically formed with a stepped outer surface and a corresponding stepped internal bore providing a series of axially spaced shoulders denoted generally by reference numbers 21, 22, 24, etc. The connector body 14 extends from a large diameter first end formed by the rolled in flange 16 to a smaller diameter second end 26. At least one, and preferably two or more, axially spaced projections, such as annularly enlarged portions 28, are formed adjacent to the second end 26 of the connector body 14 for securely mounting one end of a fluid conduit 30 to the second end 26 of the connector body 14.

As the quick connector 12 is conventional, further details pertaining to the construction of the quick connector 14 as well as standard sealing elements, such as O-rings, spacers, bearings or top hats, also typically employed in quick-type connectors, are not described or illustrated in the drawing for reasons of clarity. Details of such components can be had by referring to U.S. Pat. No. 5,213,376, the pertinent portions of which are incorporated herein by reference.

As shown in FIG. 2, a retainer element 32 is mounted within the connector body 14. The retainer element 32 has a generally annular base 34 with a central aperture formed therein for slidably receiving the fitting or conduit 18 therethrough. The fitting or conduit 18 typically includes an enlarged annular flange 36 or abutment surface which is disposed in proximity with the annular base 34 in a normal connection position.

The retainer element 32 is formed of a suitable flexible or resilient material, such as plastic or metal. Further, the retainer element 32 is formed with a plurality of circumferentially spaced tangs or legs 38 which extend angularly and radially outward from the base 34. Each tang or leg 38 terminates in a rolled-over end portion 40 which projects radially and angularly inward from the outer end of the legs 38 toward the base of the retainer element 32. The outer end 42 of each retainer element leg 38 is spaced from the annular base 34 by a distance sized to receive the annular flange 36 on the fitting 18. In this manner, the fitting 18 may be slidably inserted into the open end of the connector body 14 with the annular upset flange 36 forcing the deflectable legs 38 radially outward until the annular flange 36 seats in the gap adjacent the base 34 and the ends 42 of the legs 38 of the retainer element 32.

To disengage the fitting or conduit 18 from the connector 12, the inner ends 42 of the legs 38 of the retainer element 32 must be urged radially outward to clear the outer diameter of the annular flange 36 on the fitting 18. To affect this radial movement in a preferred embodiment, a conventional integrally mounted release member 50 is slidably mounted in the open end 16 of the connector 12.

As is conventional, the release member 50 is formed with a generally annular first end 52 having a central aperture 54 formed therein and sized to slidably receive the fitting or conduit 18 therethrough. An annular sleeve 56 extends from the first end 52 and terminates in an inner end 58 disposed adjacent to an angled ramp surface formed on the deflectable legs 38 of the retainer element 32. A plurality of radially extending projections 60 are formed on the sleeve 56 and extend radially outward of the end of the rolled-in flange 16 of the connector 12 to slidably mount the retainer element 50 through the open end 16 of the connector 12.

The length of the axial sleeve 56 of the release member 50 is selected so as to provide a predetermined amount of axial sliding movement for the release member 50 between engagement of the radial projections 60 with the inner end of the rolled-in flange 16 of the connector body 14 and engagement of the opposite end 58 of the sleeve 56 with the ramp surface on the deflectable legs 38 of the retainer element 32.

When it is desired to separate the fitting 18 and connector 12, force is exerted on the base 52 of the release member 50 to urge the release member 50 axially inward through the open end 16 of the connector 12. During such sliding movement, the inner end 58 of the sleeve 56 of the release member 50 will engage the ramp surface on the deflectable legs 38 of the retainer element 32 and deflect the legs 38 radially outward a sufficient distance to clear the outer diameter of the annular flange 36 on the fitting 18, thereby enabling the fitting 18 and the connector 12 to be disengaged or separated from each other.

In certain applications, such as that depicted in FIGS. 1 and 2, the connector 12 is mounted in close proximity to surrounding structures, barriers or components, such as the fuel filter 20 shown in FIGS. 1 and 2 by way of example only. In this mounting position in which the connector 12 is releasably connected to the male fitting or conduit 18 extending outward from at least one end wall 64 of the filter 20, the outer end of the release member 50 is in close proximity to the end wall 64 of the filter 20. The space between the base 52 of the release member 50 and the end wall 64 of the filter 20 is too small to enable a user to insert one of the previously devised quick connector release tools or to enable a user to easily grab and slidably urge the release member 50 axially inward through the open end 16 of the connector 12 to effect disengagement of the connector 12 and the fitting 18.

However, such disengagement or separation of the quick connector 12 from the fitting 18 may be achieved by use of the unique release tool 10 of the present invention. A first embodiment of the release tool 10 is shown in FIGS. 1 and 3. In this embodiment, the release tool 10 includes a pair of jaw levers, such as a first jaw lever 70 and a second jaw lever 72. The first and second jaw levers 70 and 72 are formed of generally planer members having a first handle end 74 and 76, respectively, and an opposed jaw end 78 and 80, respectively. The first and second jaw levers 70 and 72 are pivotally interconnected by means of a pivot pin 82 which extends through the intermediate portions of each of the jaw levers 70 and 72. Bifurcated jaws 84 and 86 are mounted on the jaw ends 78 and 80 of the first and second jaw levers 70 and 72 respectively.

In the first embodiment shown in FIGS. 1 and 3, although the bifurcated jaws 84 and 86 could be integrally formed as an integral part of the jaw ends 78 and 80, preferably the bifurcated jaws 84 and 86 are formed as separate members which are fixedly attached by suitable means, such as preferably by welding, or by means of suitable fasteners, to opposed surfaces of the jaw ends 78 and 80 of the jaw levers 70 and 72, respectively. The bifurcated jaw 84 is in the form of a thin, planar fork-like member having a first end 88 fixedly attached to the jaw end 78 of the jaw lever 70 and an opposed second end 90. An aperture, preferably in the form of a generally U-shaped, open ended slot 92 is formed in the fork 84 and extends inward from the second end 90 for a predetermined distance. The slot 92 divides the second end portion 90 of the fork 84 into two spaced legs 94 and 96. The width of the slot 92 is selected to enable the slot 92 to be releasably inserted about the outer diameter of a conventional fluid fitting or conduit 18, such as conduits typically provided in ¼, ⁵⁄₁₆ and ⅜ inch outer diameters.

The opposed jaw 86 is identically constructed to the jaw 84 except that the width of the slot 93 in the jaw 86 will typically be different from the width of the slot 92 in the jaw 84. This is due to the fact that the jaw 84 is designed to engage the smaller diameter fitting 18; while the jaw 86 engages the outer diameter of the connector body 14.

The release tool 10 shown in FIGS. 1 and 3 is also provided with means for adjusting the spacing between the jaws 84 and 86. Such adjusting means is provided by way of a slot 100 formed in an intermediate portion of the first jaw lever 70 through which the pivot pin 82 fixed to the second lever 72 is slidably movable. A series of spaced, raised, generally arcuate ridges, not shown in FIGS. 1 and 2, are formed on one side of the intermediate portion of the first jaw lever 70, which ridges slidably engage a single groove 102, shown in FIG. 1, formed on the facing surface of the second jaw lever 70. In this manner, the space in between the jaws 84 and 86 may be adjusted to suit the particular length of a connector 12.

In use, as shown in FIGS. 1 and 2, the release tool 10 is brought into engagement with the fitting 18 and connector 12 by sliding the slots 92 in the jaws 84 and 86 over the fitting 18 and the connector body 14. In this position, the legs 94 and 96 of the jaw 84 surround the outer diameter of the fitting 18 and are disposed in close proximity to or in direct engagement with the end 52 of the integral release member 50 mounted in the connector 12. The legs in the opposite jaw 86 are disposed in engagement with one of the annular shoulders 21, 22 or 24 on the connector body 12.

When it is desired to separate the fitting 18 and the connector 12, a closing force is exerted by the user, typically through the use of a single hand, on the handle ends 74 and 76 of the jaw levers 70 and 72, bringing the handle ends 74 and 76 together. The respective jaw ends 84 and 86 mounted on the opposite ends of each of the jaw levers 70 and 72 are likewise urged together under user applied force. This force causes the jaw 86 to grasp or engage the connector body 14 through fixed engagement between the legs of the jaw 86 with one of the annular shoulders 21, 22 or 24 on the connector body 12. Simultaneously, the opposed jaw 84 axially and slidably urges the release member 50 through the open end 16 of the connector 12, causing the inner end 58 of the release member 50 to engage and radially deflect the inner ends 42 of the legs 38 of the retainer element 32 radially outward a sufficient distance to clear the annular flange 36 on the fitting 18. This enables the fitting 18 and the connector 12 to be separated and disconnected from each other. Such separation may be implemented by use of the release tool 10 which enables the user to merely slide either the connector 12 from the fitting 18 when the fitting 18 and the component, such as the filter 20 attached thereto, are held relatively stationary.

Figure 4:
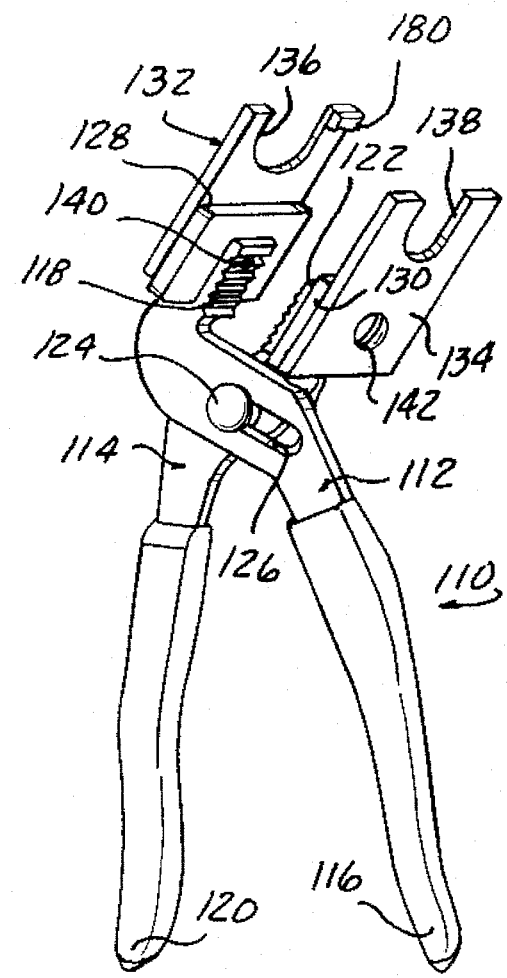
FIG. 4 is a perspective view of a second embodiment of the release tool of the present invention.

Another embodiment of the release tool of the present invention is shown in FIG. 4. In this embodiment, the release tool 110 also includes a pair of pivotally connected jaw levers, such as a first jaw lever 112 and a second jaw lever 114. The jaw lever 112 has a first handle end 116 and an opposed jaw end 118; while the second jaw lever 114 has a first handle end 120 and an opposed jaw end 122. The first and second jaw levers 112 and 114 are also pivotally interconnected by means of a pivot pin 124 mounted in jaw lever 114 and extending through a slot 126 formed in the first jaw lever 112 intermediate between the opposite ends 116 and 118 thereof.

In this embodiment, mounting bases 128 and 130 are mounted on each of the jaw ends 118 and 122, respectively. The mounting bases 128 and 130 respectively support a first bifurcated jaw 132 and a second bifurcated jaw 134. The bifurcated jaws 132 and 134 are similar to the jaws 84 and 86 shown in FIGS. 1 and 3 and described above, in that each is in the form of a thin, generally planer fork-like member having an open-ended aperture or slot 136 in the case of the bifurcated jaw 132 and an open-ended aperture or slot 138 in the case of the bifurcated jaw 134 are formed in and extend from an outer end thereof.

As in the first embodiment, the width of the slots 136 and 138 are sized to respectively receive a fitting and the outer diameter of the connector body therein. Generally, the width of the slots 136 and 138 will be different as the conduit 18 is generally smaller in diameter than the outer diameter of the connector body 14.

In this embodiment, the fork 132 and the mounting base 128 are releasably attached to the jaw end 118 of the first jaw lever 112 by fastening means, such as a threaded screw shown generally by reference number 140 in FIG. 4. A similar screw 142 is used to releasably attach the fork 134 and the mounting base 130 to the jaw end 122 of the second jaw lever 114. The fasteners 140 and 142 permit one of a number of forks, each having an aperture or slot of a predetermined width, to be interchangeably mounted on the jaw end of the release tool 110 to permit the release tool 110 to be universally used with any conventional conduit and connector.

A modification to the bifurcated jaws 132 and 134 is depicted in FIG. 5. In this embodiment, a bifurcated jaw 150 is in the form of a thin, generally planer disk. A central aperture 152 is formed in the disk 150 for receiving one of the fasteners 140 or 142 to attach the disk 150 to either of the jaw ends 118 and 122 on the release tool 110 shown in FIG. 4.

The disk 150 is formed with a plurality of circumferentially spaced forks, such as a first fork 154, a second fork 156 and a third fork 158. The forks 154, 156 and 158 may be provided in any number, with the three forks depicted in FIG. 5 being shown by way of example only. Further, the three forks 154, 156 and 158 are shown as equidistantly spaced from each other.

In this embodiment, each of the forks 154, 156 and 158 are provided with an open ended aperture or slot, with the width of each slot being different from the width of the slots in the other forks on the disk 150. In a similar disk 150 adapted to be mounted on the opposite jaw end of the release tool 110, the width of the slots in such a disk may also be provided in different dimensions, which dimensions may be the same or different from those on the disk 150 shown in FIG. 5.

In use, a pair of disks 150 each with different width slots in the forks formed thereon, are releasably attached to the jaw ends 118 and 122 of the release levers 112 and 114, respectively, by means of the fasteners 140 and 142 which extend through the central aperture 152 in each of the disks 150 into the mounting bases 128 and 130. Each disk 150 is then rotated to the desired position to place the desired fork, such as fork 154, in the generally upright, use position for engagement with either the fitting 18 or the connector 12 as described above. In this position, a detent 164 formed on and extending outward from one leg of the fork 154 engages a side edge of the mounting base 128 on the jaw end 118 to position the fork 154 in the desired use position. Similar detents 164 are also formed on the other forks 156 and 158 so as to correctly position each fork 154, 156 and 158 in the use position as well as in alignment with a fork on the disk 150 mounted on the opposite jaw end.

Another feature of the present invention is shown in FIG. 1. As shown therein, means are provided for grounding the release tool 10. The grounding means includes an electrical conductor 170 which is securely attached to the release tool 10 by means of a fastener, such as an eyelet 172 which is fixed to the first jaw lever 70 by means of a screw 174 extending through the enlarged portion of the eyelet 172 into the first jaw lever 70. The conductor 170 is connected at another end in a suitable attachment means 176 which is shown by way of example as an alligator clip. The attachment means or alligator clip 176 is connectible to earth ground, such as any metal component. This connection grounds the release tool 10 and prevents any static charge from creating a spark during use of the release tool 10.

A similar grounding means may also be employed with the tool 110 shown in FIG. 4.

In use, the attachment means 176 is connected to earth ground prior to engagement of the bifurcated jaws 84 and 86 of the release tool 10 to the fitting 18 and connector 12 as described above. The use of the grounded conductor 170 provides a significant safety advantage during the use of the release tool 10 by forming a ground path for any potential static charge buildup. As it is known that fuel flowing through the filter 20, fitting 18 and connector 12 creates static charges, and the use of electrically insulating materials, such as the rubber or other insulating materials used in the conduits 30, tends to isolate such charges on the connector 12, fitting 18 or filter 20, the use of the grounding conductor 170 provides a ground path for any such static charge buildup.

Yet another feature of the present invention is shown in FIG. 4. As shown therein, a protective material layer 180 is formed over or mounted on the fitting and connector engaging surfaces of the bifurcated jaws 132 and 134. Such protective material layer 180 may be formed as a thin pad of an insulating material, such as plastic or rubber, which is securely mounted to one surface of the bifurcated jaws 132 and 134. Alternately, the entire end portion of the bifurcated jaws 132 and 134 may be coated with an exterior layer of such protective or insulating material.

The protective material isolates the metal components of the release tool 110 from the metal fitting 18 and the metal connector 12 to prevent any static charges on such metal components from potentially creating a spark when the jaws 132 and 134 are engaged therewith. In addition, the protective coating 180 prevents scratches or abrasions from being formed on the fitting 18 and connector 12 by the bifurcated jaws 84 and 86.

It will be understood that the protective layer 180 may also be applied to the jaws 84 and 86 in the first described embodiment of the present invention shown in FIGS. 1 and 3, as well as to the disk 150 in the embodiment shown in FIG. 5.

In summary, there has been disclosed a unique release tool for use in disconnecting a fitting and a quick connector containing an internal retainer element and an integral release member. The release tool of the present invention is designed for use in applications where there is a limited amount of space between the end of the connector or the outer end of the integral release member and surrounding structure, barriers or components. The release tool of the present invention enables a user to quickly and easily separate a quick connector from the associated fitting in such limited space application by use of a single hand.

What is claimed is:

1. A tool, fitting and connector combination, the combination comprising:

a fitting having a raised annular flange ..Spaced from one end;

a connector having a housing with an open first end and a second end, the housing mountable over the fitting;

a retainer carried in the connector, the retainer having deflectable legs engageable with the annular flange to couple the fitting and the connector;

a release member slidably carried on the fitting and having first and second ends, the first end slidable into the connector to engage and deflect the deflectable legs of the retainer radially outward from the annular flange to enable separation of the fitting and the connector; and tool means for effecting axially sliding of the release member into the connector, the tool means including:

first and second pivotally connected jaw levers, each having a bifurcated jaw end with an open ended aperture respectively sized for engagement with the second end of the connector and about the fitting adjacent the second end of the release member such that pivotal movement of the jaw ends in a direction causing relative closing movement of the jaw ends toward each other simultaneously causes the jaw ends to engage the second end of the connector and the second end of the release member to effect axial movement of the retainer relative to the connector to axially urge the first end of the release member into engagement with the deflectable legs of the retainer in the connector to de-couple the deflectable legs from the fitting to enable separation of the fitting and the connector.

2. The combination of claim 1 wherein the apertures in each bifurcated jaw are open-ended slots.

3. The combination of claim 2 wherein:

each of the slots has a U-shape extending from the open end.

4. The combination of claim 1 wherein:

the width of the apertures in the bifurcated jaws are different from each other.

5. The combination of claim 1 wherein:

the bifurcated jaw ends are non-removably mounted on the jaw levers.

6. The combination of claim 1 further comprising:

means for releasably attaching the bifurcated jaw ends to the jaw levers.

7. The combination of claim 6 wherein the releasable attaching means comprises:

fastener means, extending through each of the bifurcated jaw ends and the associated jaw levers.

8. The combination of claim 1 wherein each of the bifurcated jaw ends comprises:

a generally planar disk; and a plurality of circumferentially spaced fork portions formed on the disk, each fork portion including an open ended aperture extending from an outer end of each fork portion.

9. The combination of claim 8 wherein:

the aperture in each fork portion has a different width from the width of the apertures in the other fork portions.

10. A tool adapted for releasing fittings from connectors coupled together by a retaining element disposed within the connector and releasable from the fitting on axial sliding movement of a release member mounted in one end of the connector concentrically about the fitting, the tool comprising:

first and second pivotally connected jaw levers, each having a bifurcated jaw end respectively engageable with the connector and the release member such that pivotal movement of the jaw ends in a direction causing relative closing movement of the jaw ends toward each other simultaneously causes the jaw ends to engage the connector and axially urge the release member into engagement with the retaining element in the connector de-coupling the retaining element from the fitting to enable separation of the fitting and the connector;

means, attached to one of the first and second jaw levers, for connecting the tool to electrical ground.

11. The tool of claim 10 wherein the connecting means comprises:

an electrical conductor having first and second ends, the first end fixedly attached to one of the first and second jaw levers; and attachment means, connected to the second end of the conductor, for attaching the conductor to electrical ground.

12. The combination of claim 1 further comprising:

an electrically insulating material layer disposed on a surface of each bifurcated jaw end engagable with the fitting and the connector.

13. The combination of claim 12 wherein:

the electrically insulating material layer is a pad affixed to each bifurcated jaw end.

14. The combination of claim 12 wherein:

the electrically insulating material layer is a coating disposed over each bifurcated jaw end.

15. The combination of claim 1 wherein the tool means further comprises:

the first and second jaw levers each having a handle end portion opposed from the jaw end;

pivot means for pivotally connecting the first and second levers together for pivotal movement of the jaw ends toward each other upon movement of the handle end portions toward each other.

16. The combination of claim 15 further comprising:

means for axially adjusting the spacing between the jaw ends of the first and second jaw levers.

17. The combination of claim 15 wherein the pivot means comprises:

a pivot pin fixedly mounted on an intermediate portion of one of the first and second jaw levers; and a slot formed in the other of the first and second jaw levers and slidably receiving the pivot pin therein.

18. A tool adapted for releasing fittings from connectors coupled together by a retaining element disposed within the connector and releasable from the fitting on axial sliding movement of a release member mounted in one end of the connector concentrically about the fitting, the tool comprising:

first and second levers, each having a handle end portion and a jaw end portion;

pivot means for pivotally connecting the first and second members together for pivotal movement of the jaw end portions toward each other upon movement of the handle portions toward each other;

a first bifurcated jaw mounted on the jaw end of the first member, the first bifurcated jaw including an aperture sized for releasible disposition about the fitting:

a second bifurcated jaw mounted on the jaw end of the second member, the second bifurcated jaw including an aperture sized for releasible disposition about the connector;

means, attached to one of the first and second levers, for connecting the tool to electrical ground; and wherein forced movement of the jaw end portions together urges the first and second bifurcated jaws toward each other such that the first and second bifurcated jaws respectively engage the connector and simultaneously urge the release member into engagement with the retaining element in the connector to disengage the retaining element from the fitting to enable separation of the fitting and the coupling.

19. The tool of claim 18 wherein the connecting means comprises:

an electrical conductor having first and second ends, the first end fixedly attached to one of the first and second levers; and attachment means, connected to the second end of the conductor, for attaching the conductor to electrical ground.

* * * * *